July 21, 1964  R. H. WENTORF, JR  3,141,855
METHOD FOR AND PRODUCT PRODUCED BY THE INTRODUCTION
OF BORON ATOMS INTO THE SURFACE
OF DIAMOND CRYSTALS
Filed Aug. 31, 1961
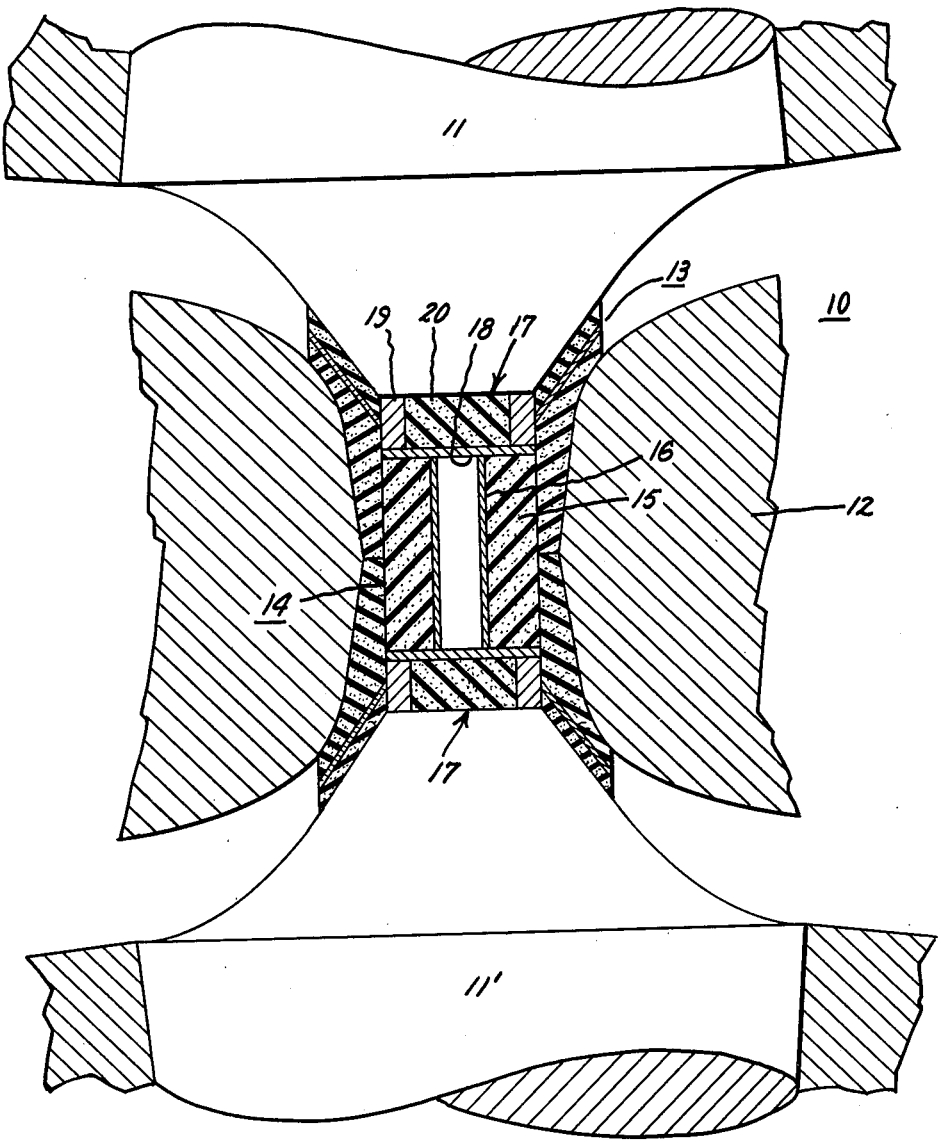
Inventor:
Robert H. Wentorf Jr.,
by James J. Lichiello
His Attorney.

3,141,855
METHOD FOR AND PRODUCT PRODUCED BY THE INTRODUCTION OF BORON ATOMS INTO THE SURFACE OF DIAMOND CRYSTALS

Robert H. Wentorf, Jr., Schenectady, N.Y., assignor to General Electric Company, a corporation of New York
Filed Aug. 31, 1961, Ser. No. 135,272
6 Claims. (Cl. 252—502)

This invention relates to electrically conductive man-produced diamonds and to a method of producing electrically conductive diamonds in a diffusion process.

The term "electrically conductive diamond" refers to a diamond crystal capable of conducting electrical current by means of mobile electrons similar to the conduction of electrical current through metals. The term is intended to exclude the conduction of electricity in a diamond crystal by connected inclusions therein of foreign materials, such as metals, where conduction is through the inclusion only. "Semiconduction," however, is included with respect to the diamonds of this invention.

Although diamond and graphite are two allotropic forms of the same element, carbon, they are separate in having different electrical properties. While carbon is classified as electrically conductive, diamond is generally considered to be an insulator. The general resistivity given to natural diamonds as electrically nonconductive is about $10^{10}$ ohm-cm. and greater. Some natural diamonds have been found which are electrically conductive, but it appears that their electrically conductive properties are generally dependent on the foreign inclusion therein and that these diamonds are conducting electricity through the inclusions alone. Natural diamonds have also been found which are electrically conductive but without conducting through inclusions, and of a characteristic blue color, but the relative scarcity and unpredictable characteristics have relegated them to objects of study and curiosity rather than to any widespread commercially usable and finite applications.

Because of a diamond's high strength characteristics and its resistance to high temperature, it is a desirable material both as a conducting and semiconducting medium. A semiconducting diamond is particularly desirable because of its inherent strength, durability, and more importantly, its relative freedom from high temperature effects which are injurious to such semiconducting materials as silicon and germanium in their notable uses.

Accordingly, it is an object of this invention to provide a method of transforming diamonds from an electrically nonconducting category to an electrically conductive category.

It is another object of this invention to change the electrical characteristics of diamond crystals.

It is another object of this invention to provide a diffusion method whereby diamonds may be made electrically conductive.

It is yet another object of this invention to provide a man-produced semiconductive diamond by a diffusion method.

It is still another object of this invention to increase the electrical conductivity characteristics of diamonds by diffusion of boron atoms into the surface thereof.

It is another object of this invention to provide a method of changing the color of diamonds.

Briefly described, this invention in one form includes, subjecting diamonds to high pressures and high temperatures in the presence of an activator material whereby atoms of the activator material diffuse into the diamond crystal lattice to change the electrical conductivity thereof.

This invention will be better understood when taken in connection with the following description and drawing in which:

The drawing is an illustration of a high pressure high temperature apparatus which may be employed to carry out the process of this invention.

The crystal lattice of diamond is generally referred to as the "diamond cubic form," the same structure taken by silicon and germanium, and with a basic bond pattern of a tetrahedral bond wherein each atom has four nearest neighbors bound to it by valence binding forces. The diamond cubic lattice is an example of an open as distinguished from a closed packed structure with the distance between centers of nearest neighboring atoms of a diamond cubic crystal about 1.54 A. and a lattice size of $a_0 = 3.56$ A. As a semiconductor, the diamond crystal lattice must accept foreign atoms as impurities in the same manner as foreign atoms are included or accepted in other well known semiconductors. Impurities may be interstitial or substitutional. In the first instance, the atoms are wedged between lattice atoms, while in the second, they replace lattice atoms. The small size of the diamond lattice as compared to silicon for example ($a_0 = 5.42$ A.) is restrictive to the entrance of impurities.

Many attempts have been made to make natural diamonds electrically conductive with various processes well known in the semiconductor art by which atoms of an activator materials, for example, gallium or indium, are caused to proceed into another or host material, for example germanium, when the presence of each other at high temperatures. These processes are referred to as "doping" to be inclusive of, for example, radiation, impregnating, diffusing, injection, etc. However, not all materials are satisfactory for this process since the transfer of atoms depends upon such features as different energy levels of electrons, size and spacing of atoms, etc. These processes, with the exception of radiation, as applied to natural diamonds, have not provided any positive results. For example, attempts to dope natural diamonds in the usual manner by diffusion or impregnation with such activator materials as boron, aluminum and nitrogen did not indicate any transferring of atoms of these materials into the diamond crystal, since no change in electrical characteristics was observed.

It has been discovered, however, that the electrical characteristics of diamonds may be changed or altered if a preferred form of a diffusing process is applied. Contrary to the usual low pressure diffusion process, it has been discovered that diamond may be made electrically conductive by the diffusing of particular activator materials therein under the conditions of high pressures and high temperatures. The prior art contains several high pressure apparatuses which will sustain these pressures and temperatures. One apparatus is adequately disclosed and claimed in U.S. Patent 2,941,248, Hall et al. By reference therefor the disclosure of the above-mentioned U.S. patent is incorporated herewith.

Referring now to the drawing, there is illustrated one preferred embodiment of a high pressure high temperature apparatus 10 as illustrated and described in the aforementioned U.S. patent. Apparatus 10 includes, generally, a pair of punch assemblies 11 and 11' which together with a belt member 12 define a reaction zone. Suitable stone gasketing 13 is positioned between the punches 11 and 11' and belt 12' to seal the reaction zone and to undergo compression to permit punches 11 and 11' to move towards each other to compress a reaction vessel 14. Reaction vessel 14 comprises a hollow electrically nonconducting cylinder 15 adapted to contain an electrically conducting tube 16 which is the sample material depository. On each end of cylinder 15 there is an end cap assembly 17 which includes an electrically conductive disc member 18 and an electrically conductive ring 19 encircling a plug of electrically insulating material 20. By connecting the punches to a suitable source of electrical power, current is caused to flow through one of the punch assemblies, for example 11, through ring 19, disc 18, tube 16 and/or through the material itself to provide electrical resistance heating of the sample material, and in reverse order to punch 11'. A more complete description of the operation and design of this high pressure high temperature apparatus together with the electrical circuitry involved and the calibration thereof is found in the above-mentioned U.S. patent. Calibration of such an apparatus may vary. One preferred method of calibration is represented by a curve of pressure vs. press load where the pressure is based upon electrical transition values of certain metals as bismuth, thallium, cesium and barium. Such a curve commences at pressure and press load of 0 (FIG. 8 of U.S. Patent 2,941,248) and proceeds through 77,000 atmospheres for the barium transition. Pressures in this application are based upon the same barium transition but at about 60,000 atmospheres and a bismuth transition of about 25,000 atmospheres.

In the practice of this invention, selected natural and/or man-produced diamonds are placed in the reaction vessel 14 of FIG. 1, in tube 16 thereof, together with a suitable packing material, such as graphite, and an activator material. The sample is then subjected to high pressures and high temperatures and atoms of the activator material diffuse into the diamond crystal. Activator elements which have been found to diffuse into diamond in this process are boron and compounds of boron which will decompose to provide boron or boron carbide during the diffusing process. For example, boron may be employed by way of compounds which include $B_4C$, $M_2O_3$, $BN$, $NaB_4O_7$, $B_{10}H_{14}$, $NiB$, $LiBH_4$, $BP$, etc.

The particular configuration of the activator material employed is of no salient importance, since it may be added in various solid configurations, such as discs, tubes, plugs, cylinders, and any other geometrical or irregular shape, particles, powder, etc.; the latter powder form is preferred in this invention. With respect to the amount of activator material, various amounts may be employed with no marked difference in the final result. It appears that insofar as diffusion is concerned, the addition of the activator material to the mixture generally will provide an electrically conductive diamond which is not electrically conductive through inclusions alone. It is, of course, understood that the amount added must be more than a trace amount or insignificant quantity. In general, activator additions of about 0.1% to 50% by weight of diamonds provide electrically conductive diamonds in all instances.

The following examples are indicative of the diffusion process. In all examples, the diamonds employed were carefully selected for minimal inclusions, cleaned, and tested for electrical conductivity or resistance. The resistivity for these diamonds before treatment was found to be about $10^{10}$ ohm-cm. at 25° C.

*Example 1*

In the reaction vessel of FIG. 1, tube 16 was carbon, .080 inch I.D., .120 inch O.D., and .450 inch long. Tube 16 was filled with equal amounts by weight of boron carbide, graphite, and natural diamonds of about 0.5 mm. in size. The apparatus was operated to provide about 64,000 atmospheres pressure on the reaction vessel and temperature was raised to about 1900° C. These conditions were maintained for about 60 minutes after which they were lowered and the diamonds recovered from the reaction vessel. After acid cleaning, their electrical conductivities were measured and their resistances were found to be in the range between $2 \times 10^3$ and $2 \times 10^5$ ohms at 25° C. Their resistivities were correspondingly estimated to be between about $10^2$ and $10^4$ ohm-cm. This example was repeated several times in the range of 47,000 to 65,000 atmospheres and 1300° C. to 2000° C. After treatment, many of the diamonds included portions of a dark blue color or had dark blue surface regions.

*Example 2*

The conditions of Example 1 were repeated with boron instead of boron carbide and using both man-produced and natural diamonds of about 0.2 to 1 mm. in size. Several runs were made in a 30 to 60-minute time range. After recovery and cleaning, the diamonds were tested and found to have an average electrical resistance in the range of $7 \times 10^3$ to $2 \times 10^5$ ohms. Their corresponding resistivities were estimated to be between about 350 to $10 \times 10^3$ ohm-cm.

*Example 3*

In the following example, the apparatus and process of Ex. 1 were employed. In each instance, as tabulated below, powdered boron carbide and graphite was employed together with man-produced diamonds of about 0.1 to 0.2 mm. in size consisting of octahedra or cubo-octahedra. All materials were in equal parts by weight.

| Pressure, Atmospheres $\times 10^3$ | Approx. Temp., ° C. | Time min. | Typical resulting crystal resistances, megohms |
|---|---|---|---|
| 63 | 1,300–1,450 | 12 | 0.3–5 |
| 63 | 1,500–1,600 | 12 | 0.1–1.5 |
| 63 | 1,600–1,700 | 15 | 0.02–0.3 |
| 63 | 1,800–1,900 | 15 | 0.01–1 |
| 63 | 1,900–2,000 | 15 | 0.02–0.1 |
| 8.5 | 1,500–1,600 | 12 | 0.07–200 |

The range of temperatures, as indicated in the above table, takes account of the fact that the ends of the reaction vessel tend to be somewhat cooler than its central portion. Too many man-produced diamonds were used to permit complete testing for each one separately, but some of the man-produced diamonds showed a very high resistance, of the order of $10^9$–$2 \times 10^{10}$ ohms, when tested prior to exposure to boron, and substantially all crystals of this kind of diamond which were tested after exposure to boron showed a resistance low enough to be easily measured by a conventional volt-ohm-milliammeter. Since it is undetermined how deeply or uniformly boron has penetrated a particular diamond crystal, the measurements of resistance are reported in ohms for each crystal. If the activator has penetrated the crystals uniformly, then one might properly report their resistivity, which is a bulk property. All resistance measurements were made at room temperature.

It will be noted in Example 3, that the resistivity falls as the temperature of treatment increases, as one would expect from a diffusion process. It is also noted that both natural and man-produced diamonds can be made to become electrically conducting by this treatment.

The electrical resistance of such a treated diamond crystal at 100° C. is usually about 90% of its resistance at 25° C. From the variation of electrical resistance with temperature, it appears that the activation energy for conduction in diamonds containing diffused-in boron is about one half to one tenth the activation energy for conduction in diamonds grown in the presence of boron. Thus, the diffusing of boron into diamonds produces a result which is physically different from the incorporation of boron atoms during a diamond growth process.

If it be assumed that the conductivities of the crystals containing boron are proportional to their boron content, a graph made of the logarithm of the average conductivity vs. the reciprocal of the temperature of treatment for batches of crystals exposed for 12 minutes, provides a reasonably straight line which has a slope corresponding to an activation energy of about 80 kcal./mole. Such an energy is comparable with the bonding energies among boron and carbon atoms, and suggests that the rate-limiting step in the entry process involves the breaking of chemical bonds.

It was found that pressure differences have an effect upon the changes produced in the crystals by boron diffusing. Using a treatment temperature of about 1600° C. maintained for 12 minutes, crystals from an exposure made at 8500 atmospheres had resistances of about $10^5$ ohms or more at 25° C. Similar crystals exposed for the same time at the same temperature but at 65,000 atmospheres had resistances ranging from $10^5$ ohms down to $6 \times 10^3$ ohms at 25° C.

The effect of pressure, in boron diffusion, between 8500 atmospheres and 85,000 atmospheres is quite noticeable. Some of the man-made diamonds treated at 8500 atmospheres showed a diminished change in electrical resistance, while all those tested from a run made at 63,000 atmospheres and a slightly lower temperature exhibited easily measurable conductivity. A possible explanation of this effect is that the diamond lattice is relatively stiff and is not greatly compressed even at 65,000 atmospheres, so that the diffusion rates inside the crystal are not very sensitive to external pressure. On the other hand, the fugicity difference of boron between the exterior and the interior of the crystal is increased at higher total pressures. Thus higher pressures favor more rapid entry of the boron, at any temperature. Of course higher operating temperatures are permitted at higher pressures because of the increased thermodynamic stability of diamond at higher pressures.

This effect of pressure in this diffusion process is contrary to the usual theories regarding diffusion, and is a new method of solid state diffusion in diamond. Evidently different processes are involved in diffusion in a diamond and graphitization of the diamond. Thus it may be possible to greatly reduce the graphitization rate of a diamond crystal while selected kinds of atoms are diffusing into it by carrying out the diffusion operation at high pressures. It was found that the diffusion of boron into the diamond crystals was accompanied by a change in their color. The longer and hotter the diffusion treatment, the greater the tendency for the diamonds to become blue or violet in color, particularly on their surfaces. The electrical properties of a diamond crystal are modified by the introduction of boron atoms.

In the foregoing examples, all materials utilized were known materials with known impurity content. This applies not only to the graphite catalyst and activator employed, but also to reaction vessel materials, and, in effect, to all materials which would ordinarily by involved. Thus, for example, diamonds have been subjected to similar conditions in the presence of various materials and the diamonds recovered were neither blue in color nor electrically conductive. These results are known for a great number of operations. Accordingly, a repeat operation but with a diamond crystal and high purity boron, for example, results in blue and electrically conductive diamonds.

High purity boron may contain very small amounts of impurities, as determined by spectrographic and X-ray analysis, such as carbon, sulfur, silicon, tantalum, nitrogen, oxygen, hydrogen, iron, aluminum, calcium, magnesium, copper, manganese, zirconium and sodium. Many of these elements are present in only very small trace amounts, and not all are present in boron prepared by different processes. The major impurities in high purity boron of 99.8%+ boron, are carbon, silicon, iron and sodium. In any event, many of these elements are present in natural and man-produced diamonds which are neither blue nor electrically conductive. Furthermore, many of these materials are present in surrounding and contiguous objects in a diamond growth reaction and the diamonds obtained are neither blue nor electrically conductive. In addition, diamonds have been grown by direct addition of these impurities with no blue or electrically conducting diamond resulting. The evident conclusion is that in view of these results taken in connection with the p-type crystals as hereinafter described, boron is the activator material.

The term "electrically conductive" as employed, is intended to mean conductive other than through included impurities such as catalyst metal, etc. For example, in a cubic crystal, a poor quality man-produced diamond may have metal impurities extending or interconnecting from one face to an opposite face, and when these faces are placed between electrical probes, current conduction can take place through the metal inclusion alone. Conduction may also take place because of surface impurity conduction. These and other related methods of conducting have been excluded and conduction has been found to be through conduction carrier mobility of the crystal structure.

More specifically, the diamonds resulting from each example were carefully screened for those of good clarity and form with no apparent impurities and no impurities under $30 \times$ magnification which would indicate extensive inclusions between faces. Thereafter, these diamonds were treated with a hot concentrated sulfuric acid and potassium nitrate solution to dissolve any surface impurities and to leach out any inclusions having a surface contact. Aqua regia was also employed in the cleaning process.

The processed diamonds were then placed between silver conductors connected to a volt-ohm-milliampere meter for resistivity measurement. Several measurements were made to include different faces of each crystal and usually only minor changes in resistivity were noted for the same crystal. The activation energy for conduction was found to be about 0.02–0.04 electron volt.

Several semiconductive tests were performed on the selected and cleaned diamond crystals as follows. A single crystal was placed within a small diameter Pyrex tube and a silver wire probe inserted in each end of the tube adjacent the crystal. The silver probes were connected to a volt-ohm-milliampere meter so that the resistance of the crystal could be measured. The tube apparatus was heated to about 100° C. After temperature stabilization the resistance of the crystal was measured. In all instances, electrical resistance decreased with a rise in temperature indicating that the conductivity was true semiconduction and not conduction by metallic or graphatic inclusions. All measuring voltages in this specification were about 4–6 volts.

Semiconductivity was also ascertained by the thermoelectric power method as follows. If, for example, a nickel catalyst were employed in the growth process for man-made diamonds, it may be assumed that conductivity may take place through nickel inclusions. A diamond crystal (cleaned as described) was placed between two silver electrodes each at a different temperature so as to provide a thermocouple circuit. If conductivity takes place through nickel then the nickel-silver thermocouple voltage characteristics should be observed. In the instance as described the observed thermocouple voltage characteristics were not that of nickel-silver. This test was repeated several times and for various crystals with each instance indicating voltage characteristics different from assumed metals which may be present in the crystal.

The electrically conductive diamonds of the above examples were discovered to be similar in nature to that of p-type semiconductors. This was established by the sign of their thermoelectric power, that is, by the direction of the voltage gradient developed in them when they were placed in a temperature gradient. Between silver metal probes, the boron-doped diamonds showed typical thermoelectric powers of about 50 microvolts/° C.

Those semiconductors which conduct by the agency of the electron vacancy or "positive hole" are referred to as the p-type defect semiconductors. The absence of a negative electron or electron vacancy is the alternate terminology to describe the term "positive hole." The motion of the hole carries a positive charge, because the region was electrically neutral before the electron was removed. The vacancy moves in the proper direction for a positive particle, however, only because of the negative mass characteristics of the electrons in the energy neighborhood. The accepted boron atom, for example, containing three electrons, competes with surrounding carbon atoms to have a fourth electron for a total of 8 as a well-known filled shell. The competition results in a hole and thus a p-type crystal.

The process is applicable to the production of colored diamonds where blue diamonds are desired ranging from the very light blues to the deep purples, and thus the invention becomes also a process for coloring diamonds. It has been described that, ordinarily, diamonds grown with the described catalysts may vary in colors of brown, green, yellow, white and black and various shades thereof depending on temperatures and pressures employed. At high pressures and temperatures diamonds grown become more clear or white, and boron addition may provide diamonds ranging from light blue to deep purple. Generally, at lower pressures and temperatures colors may be obtained which are combinations of blue and the aforementioned colors and single crystals may be partly blue and partly green and other combinations. For some purposes it may be desirable to diffuse impurities into only selected portions of a crystal.

It is also obvious to those skilled in the art that the described process is equally applicable for diffusion into a diamond seed crystal, electrically conductive or not, or into diamond growth on any seed crystal, for example, for semiconductor junctions.

A semiconductive diamond prepared in accordance with the teachings of this invention may also subsequently be subjected to high pressures and high temperatures without being in the presence of an activator material. Such a practice modifies the electrical characteristics of the semiconducting diamond by permitting atoms of the activator material to diffuse out of or from the diamond. It also appears, by this practice, that some activator atoms in the diamond are reoriented or rearranged. Representative examples of diamonds subjected to this treatment displayed higher thermoelectric powers and a greater temperature dependence of resistivity compared to the same diamonds before treatment.

Diamond crystals having activator materials diffused therein are structurally or mechanically different by containing the activator material atoms. Thus, different properties, other than electrical, are obtained. For example, diffused in atoms in various localities may increase the strength or toughness of the crystal.

While electrical conductivity measurements have been clearly described with respect to silver probes and given conditions, it is understood that various other probe materials such as gold, copper, iron, etc., may also be employed. It is evident that variations in conductivity may be predicated on the particular probe material and/or apparatus. It is sufficient to say that electrically conductive diamonds are produced which have an electrical conductivity substantially exceeding the conductivity before diffusion and which are semiconducting.

While other modifications of this invention and variations that may be employed within the scope of the invention have not been described, the invention is intended to include all such as may be embraced within the following claims.

What I claim as new and desire to secure by Letters Patent of the United States is:

1. A method for diffusing boron atoms into a diamond crystal comprising the steps of:
   (a) subjecting a diamond crystal to a pressure of at least 8500 atmospheres and a temperature of at least 1300° C. in the presence of an activator material,
      (1) said activator material being a substance from which under the operating pressure and temperature boron atoms are removed from said substance and are ultimately diffused into the lattice of said diamond crystal,
      (2) said activator material being present in an amount by weight in the range of from about 0.1 percent to about 50 percent of the weight of diamond, and
   (b) removing the boron-impregnated crystal.

2. The method substantially as recited in claim 1 wherein the activator material is boron carbide.

3. A method for diffusing boron atoms into a diamond crystal comprising the steps of:
   (a) subjecting a diamond crystal to a pressure of at least 8500 atmospheres and a temperature of at least 1300° C. in a reaction chamber in the presence of an activator material,
      (1) said activator material consisting of at least one substance chosen from the class consisting of $B_4C$, $B_2O_3$, BN, B, $NaB_4O_7$, $B_{10}H_{14}$, NiB, $LiBH_4$ and BP,
      (2) said activator material being present in an amount by weight in the range of from about 0.1 percent to about 50 percent of the weight of diamond, and
   (b) removing said diamond crystal containing surface diffused boron atoms from said reaction chamber.

4. The method substantially as set forth in claim 3 wherein the activator material is boron.

5. The method substantially as set forth in claim 3 wherein the activator material is boron carbide.

6. A diamond crystal containing boron atoms diffused into the surface thereof, said diamond crystal being produced by the process steps comprising:
   (a) subjecting a diamond to a pressure of at least 8500 atmospheres and a temperature of at least 1300° C. in the presence of an activator material,
      (1) said activator material being a substance from which under the operating pressure and temperature boron atoms are removed from said substance and are ultimately diffused into the lattice of said diamond crystal,
      (2) said activator material being present in an amount by weight in the range of from about 0.1 percent to about 50 percent of the weight of diamond, and
   (b) removing the diamond crystal with boron atoms diffused in the surface thereof.

References Cited in the file of this patent
UNITED STATES PATENTS
2,947,609   Strong _____ Aug. 2, 1960

OTHER REFERENCES
Smith: Semiconductors, published by the Syndics of the Cambridge University Press, N.Y. (pages 378–380).